United States Patent [19]

Ohsawa

[11] Patent Number: 4,692,931
[45] Date of Patent: Sep. 8, 1987

[54] SYNCHRONIZATION CIRCUIT CAPABLE OF ESTABLISHING SYNCHRONISM EVEN WHEN A SAMPLING RATE IS INVARIABLE

[75] Inventor: Tomoki Ohsawa, Tokyo, Japan

[73] Assignee: NEC Corporation, Japan

[21] Appl. No.: 792,765

[22] Filed: Oct. 30, 1985

[30] Foreign Application Priority Data

Oct. 31, 1984 [JP] Japan .............................. 59-229508
Mar. 14, 1985 [JP] Japan .............................. 60-50936
Sep. 11, 1985 [JP] Japan .............................. 60-202365

[51] Int. Cl.⁴ .............................................. H04L 7/00
[52] U.S. Cl. ..................................... 375/106; 328/63; 307/527
[58] Field of Search ................. 375/99, 101, 106, 114, 375/118; 328/63, 72, 164, 165; 371/42, 46; 307/527

[56] References Cited

U.S. PATENT DOCUMENTS

| | | | |
|---|---|---|---|
| 4,032,847 | 6/1977 | Unkauf ................................ | 375/101 |
| 4,165,488 | 8/1979 | Guidoux et al. ..................... | 375/99 |
| 4,308,618 | 12/1981 | Levy et al. .......................... | 328/164 |
| 4,321,705 | 3/1982 | Namiki ................................ | 328/165 |
| 4,376,309 | 3/1983 | Fenderson et al. ................. | 375/101 |
| 4,416,017 | 11/1983 | Jasper et al. ........................ | 375/99 |
| 4,453,259 | 6/1984 | Miller ................................... | 375/106 |

Primary Examiner—Robert L. Griffin
Assistant Examiner—Stephen Chin
Attorney, Agent, or Firm—Laff, Whitesel, Conte & Saret

[57] ABSTRACT

In a synchronization circuit for use in demodulating an input signal carrying a transmission data signal at a symbol rate, a sampling circuit samples the input signal at a predetermined sample rate which may be different from the symbol rate, to produce a sequence of sampled signals. The sampled signal sequence is interpolated by the use of an interpolator into first and second partial interpolated signals which have different phases from each other. The first and second partial interpolated signals are processed by a processing circuit to produce timing errors between the first partial interpolated signals and the sampled signal sequence. The processing circuit controls the phases of the first and second partial interpolated signals with reference to the timing errors so that the both partial interpolated signals are derived at predetermined points of the sampled signal sequence. On reception of the transmission data signal of a multi-level divisible into a plurality of bits, the interpolator comprises a plurality of elementary interpolators for interpolating the respective bits to produce fragmentary interpolated signals. The fragmentary interpolated signals are combined into the interpolated signal sequence. The elementary interpolators may be controlled by two internal samplers in consideration of the timing errors.

5 Claims, 13 Drawing Figures

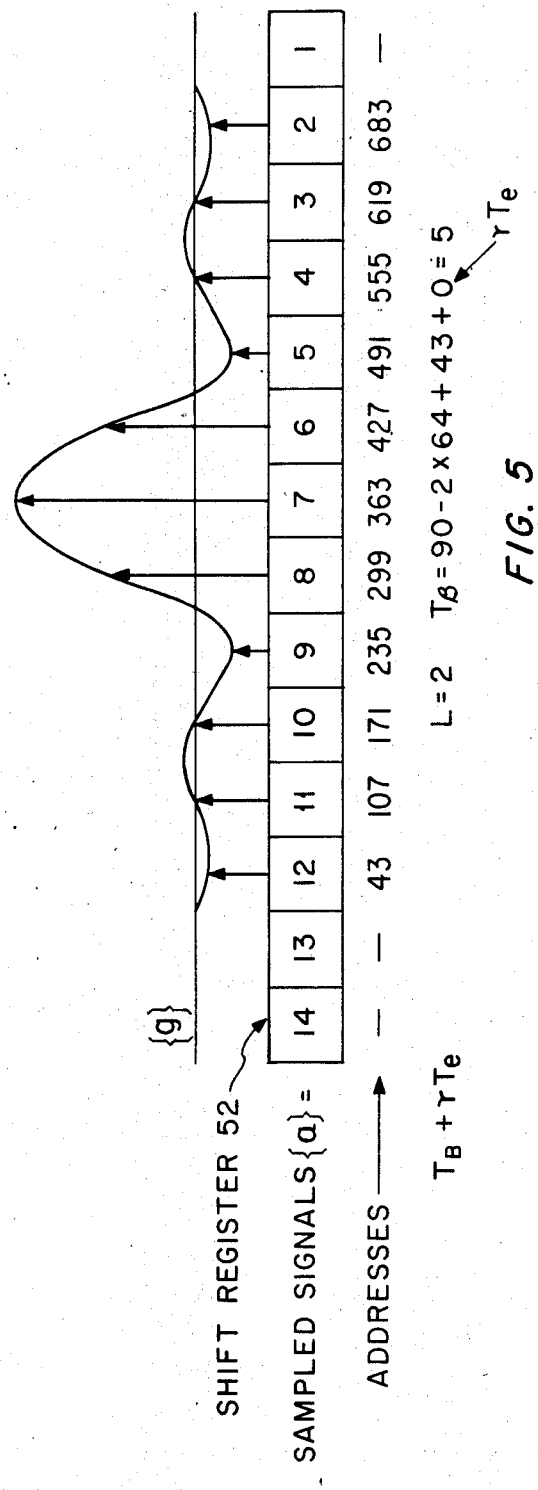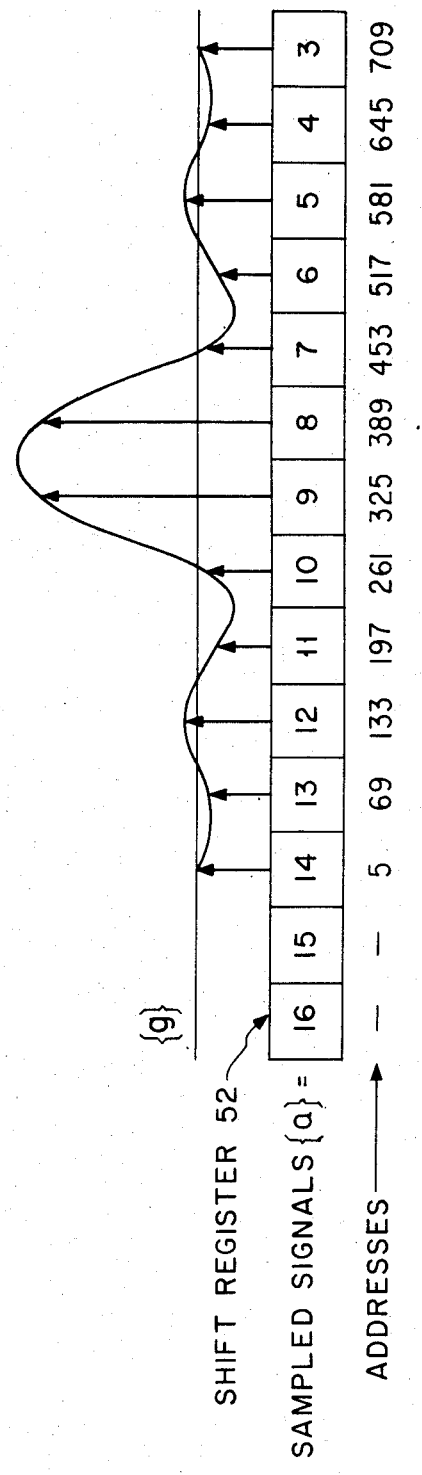
FIG. 5
FIG. 6

SYNCHRONIZATION CIRCUIT CAPABLE OF ESTABLISHING SYNCHRONISM EVEN WHEN A SAMPLING RATE IS INVARIABLE

BACKGROUND OF THE INVENTION

This invention relates to a synchronization circuit for use in controlling synchronization on demodulation of an input signal.

In Japanese Unexamined Patent Publication No. Syô 59-141,847, namely, No. 141,847/1984, a synchronization circuit of the type described herein is revealed by Junji Namiki, assignor to NEC Corporation, and is operable in response to an input signal carrying a sequence of transmission data signals at a symbol rate or baud rate which will herein be called "a transmission rate". The synchronization circuit establishes synchronism by directly controlling sampling time instants.

More specifically, the input signal is supplied to first and second samplers which are operable in response to a first sampling signal of a predetermined phase and to a second sampling signal of a $\pi$ phase relative to the first sampling signal, respectively. Anyway, first and second sampled signals are produced from the first and second samplers, respectively, and processed into phase difference signals representative of phase differences between the transmission data signals and the sampling time instants. The phase difference signals are sent to a timing controller for controlling the first and second sampling signals. Eventually, the first and second sampling signals are phase matched with the transmission data signals. Thus, each of the first and second sampling signals is varied in frequency and phase by the timing controller in accordance with the phase difference signals.

However, the synchronization circuit revealed by Namiki can not be used when a sampling rate is invariable and is different from the transmission rate of the transmission data signals. A great deal of calculations would have to be carried out at a high speed to accomplish the desired operation in response to an invariable sampling rate.

SUMMARY OF THE INVENTION

It is an object of this invention to provide a synchronization circuit which can control synchronization even when a sampling rate is invariable.

It is another object of this invention to provide a synchronization circuit of the type described, which is operable even when the sampling rate is different from a symbol rate or baud rate of transmission data signals.

It is still another object of this invention to provide a synchronization circuit of the type described, which can accomplish the desired operation at a low speed of calculations.

It is yet another object of this invention to provide a synchronization circuit of the type described, wherein an amount of calculations can be reduced.

According to this invention, a synchronization circuit is responsive to an input signal carrying a transmission data signal at a transmission rate and produces an output signal which representative of reproductions of the transmission data signal. The circuit comprises sampling means for sampling the input signal at a sample rate to produce a sequence of sampled signals at the sample rate. Interpolating means are coupled to the sampling means for interpolating the sampled signal sequence to produce an interpolated signal sequence. Processing and processing means are coupled to the interpolating means for processing the interpolated signal sequence to produce the output signal at the transmission rate.

BRIEF DESCRIPTION OF THE DRAWING

FIG. 5 is a view for use in describing that operation of the synchronization circuit illustrated in FIG. 4 which is carried out in response to a current one of interpolated signals under a predetermined condition;

FIG. 6 is a view for use in describing that operation of the synchronization circuit under the predetermined condition, which is carried out in response to the following interpolated signal;

DESCRIPTION OF THE PREFERRED EMBODIMENTS

Figure 1:
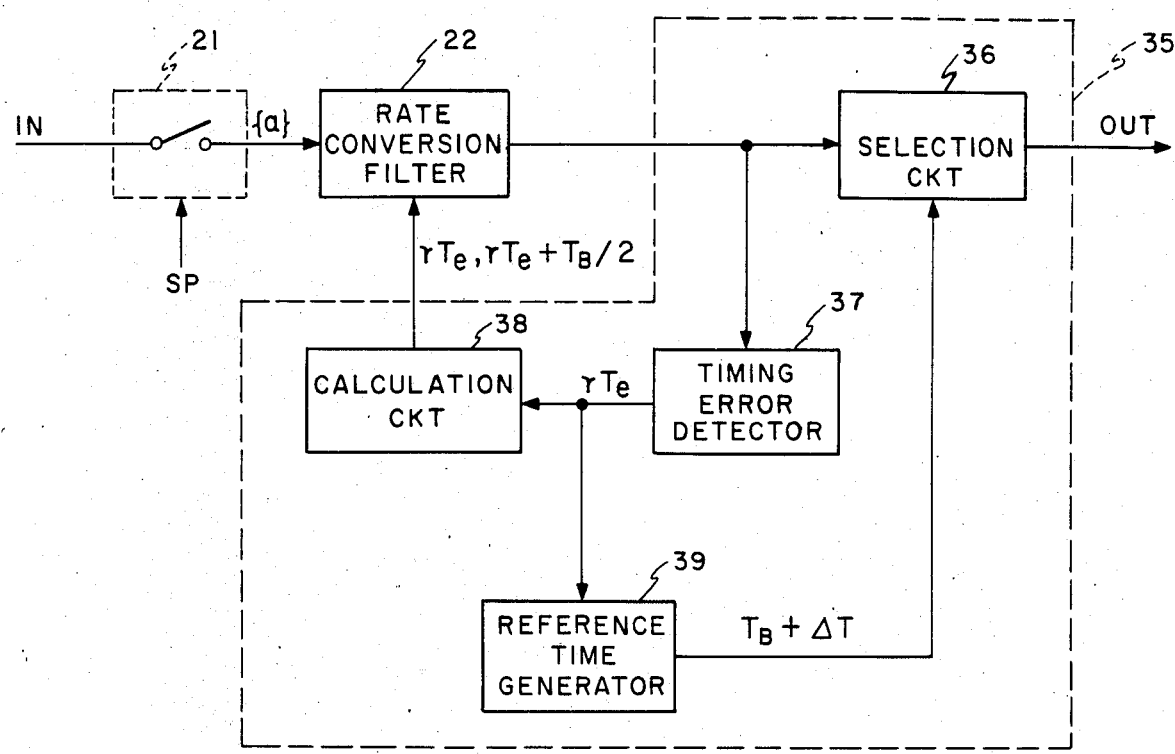
FIG. 1 is a block diagram of a synchronization circuit according to a first embodiment of this invention.
Figure 2:
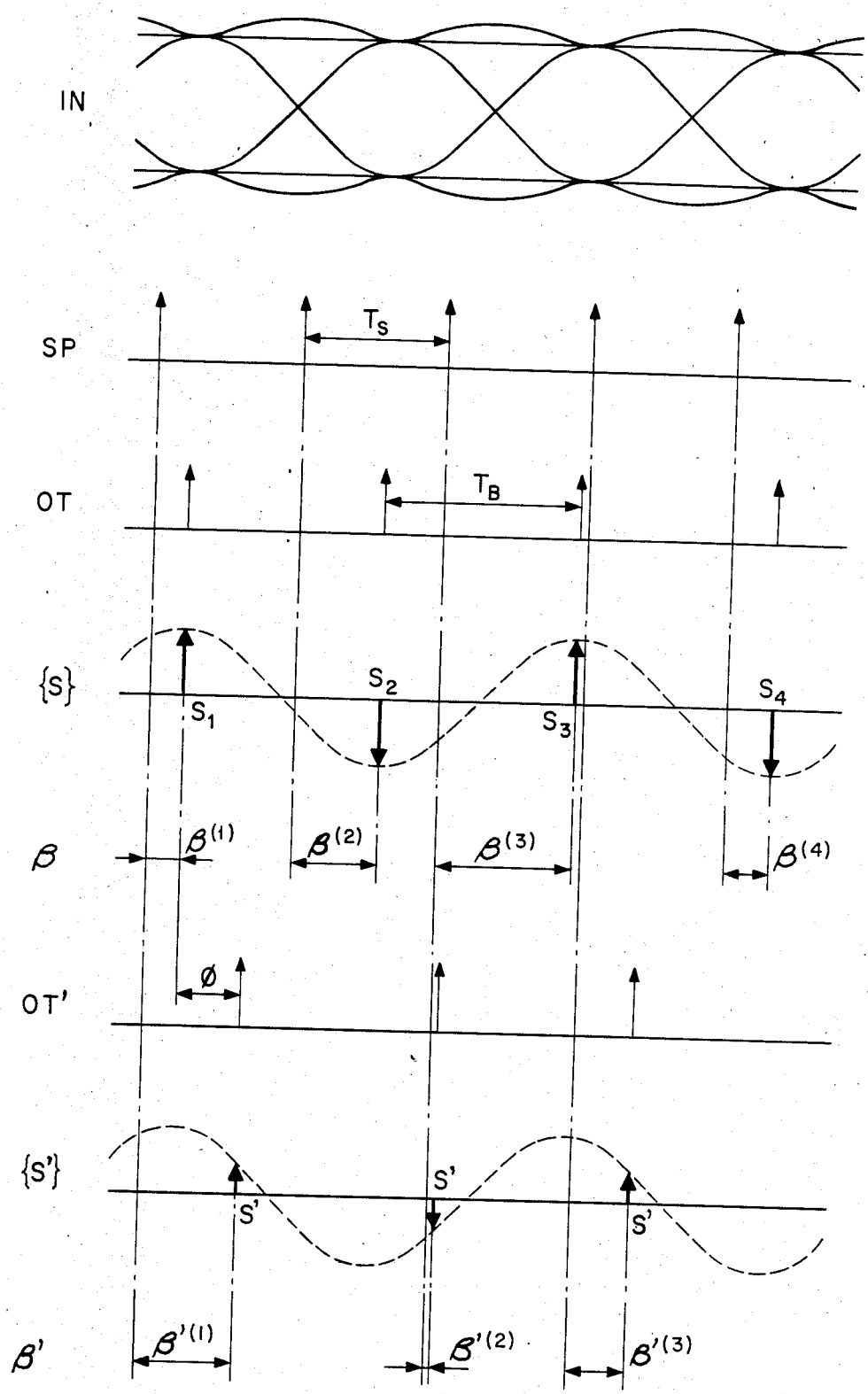
FIG. 2 is a time chart for use in describing operation of the synchronization circuit illustrated in FIG. 1.

Referring to FIGS. 1 and 2, a synchronization circuit according to a first embodiment of this invention is supplied with an input signal IN which carries a sequence of transmission data signals at a symbol rate (baud rate) which will be represented by B. In other words, the transmission data signal sequence is transmitted at every symbol period $T_B$ determined by the symbol rate B. As shown at the top of FIG. 2, the input signal IN exhibits an eye pattern having an eye opened at every symbol period $T_B$.

In FIG. 1, the illustrated synchronization circuit comprises a sampling circuit 21 for sampling the input signal IN by a main sampling signal SP of a sampling frequency $f_S$ which is equal to a reciprocal of a main sampling period $T_S$. As a result, the input signal IN is sampled at main sampling time instants, as shown at SP in FIG. 2. The illustrated sampling period $T_S$ may be invariable and different from the symbol period $T_B$. Therefore, the input signal IN may be sampled at portions at which the eye patterns of the input signal IN are closed. At any rate, the sampling circuit 21 produces a sequence of sampled signals which is simply depicted at {a} in FIGS. 1 and 2 and which may be represented by {a(nT$_S$)} in consideration of the sampling period T$_S$.

The sampled signal sequence {a} is sent to a rate conversion filter 22. The rate conversion filter 22 converts a sampling rate of the sampled signal sequence {a} in a known manner.

For a better understanding of this invention, a general rate conversion filter will be described with reference to FIGS. 1 and 2. The general rate conversion filter carries out rate conversion and produces a filter output signal determined by an impulse response, as will be described below.

Let the impulse response and the filter output signal of the rate conversion filter 22 be represented by g(t) and s(t), respectively. As is known in the art, the filter output signal s(t) is defined by a convolution of the sampled signal sequence {a} and the impulse response g(t) and is therefore given by:

$$s(t) = \sum_{n=-\infty}^{\infty} a(nT_S) \cdot g(t - nT_S). \qquad (1)$$

As is readily understood from Equation (1), the general rate conversion filter may have a time delay equal to t so as to calculate the filter output signal s(t) from the sampled signal sequence {a(nT$_S$)} at optional time instants t. When the time instants t appear at a symbol period T$_B$, Equation (1) is rewritten into:

$$s(mT_B) = \sum_{n=-\infty}^{\infty} a(nT_S) \cdot g(mT_B - nT_S). \qquad (2)$$

Thus, Equation (2) specifies a rate conversion filter for producing a filter output signal sequence {s(mT$_B$)} at the symbol period T$_B$ in response to the sampled signal sequence {a(nT$_S$)} having the sampling period T$_S$.

The term (mT$_B$) of Equation (2) is representative of filter output timings, namely, filter output time instants and depicted at OT in FIG. 2. The term (mT$_B$) is rewritten by the use of T$_S$ into:

$$mT_B = kT_S + \beta^{(m)}, \qquad (3)$$

where $\beta$ is indicative of a time difference between each sampling time instant SP and the corresponding output time instant OT and is smaller than T$_S$. The time difference $\beta^{(m)}$ is illustrated in FIG. 2 along the line below {s}.

As a result, the filter output signal sequence s(mT$_B$) appears at every symbol period T$_B$ with the time difference $\beta$ left between each main sampling time instant SP and the corresponding output time instant OT, as illustrated in FIG. 2.

Under the circumstances, substitution of Equation (3) into Equation (2) results in:

$$s(mT_B) = \sum_{n=-\infty}^{\infty} a(nT_S) \cdot g\{\beta^{(m)} + (k-n)T_S\}. \qquad (4)$$

If i is substituted for (k−n), Equation (4) is further rewritten into:

$$s(mT_B) = \sum_{k-i=-\infty}^{\infty} a\{(k-i)T_S\} \cdot g\{\beta^{(m)} + iT_S\} \qquad (5)$$

-continued
$$= \sum_{i=-\infty}^{\infty} a\{(k-i)T_S\} \cdot g\{\beta^{(m)} + iT_S\}.$$

In Equation (5), an absolute value of g(iT$_S$) becomes extremely small and negligible when an absolute value of i becomes large. Accordingly, i may be restricted to a finite range between (−N/2) and N/2, when N is indicative of an integer. Thus, Equation (5) may approximately be represented by:

$$s(mT_B) = \sum_{i=-N/2}^{N/2} a\{(k-i)T_S\} \cdot g\{\beta^{(m)} + iT_S\}. \qquad (6)$$

In FIG. 2, the filter output signal sequence {s} is calculated in accordance with Equation (6). As exemplified in FIG. 2, the filter output signals s$_1$ through s$_4$ can be produced in consideration of the time differences $\beta$ between the filter output signals and the nearest ones of the sampled signals a$_1$ through a$_5$ that are placed before the filter output signals. For example, the second one of the filter output signals s$_2$ is positioned in consideration of the second one of the time differences $\beta^{(2)}$.

The above-mentioned description is made on the premise that an initial phase shift or displacement is absent in the output time instants (OT). However, such an initial phase shift practically inevitably takes place.

As shown at OT' in FIG. 2, let output time instants be initially shifted by $\phi$ relative to the output time instants OT which may be called "normal time instants". In this event, an output signal sequence and time differences are phase-shifted, as depicted at {s'} and $\beta'$, respectively.

From this fact, it is seen that such an initial phase shift makes it difficult to correctly reproduce the transmission data signals. This is also true of any other phase shift.

Figure 3:
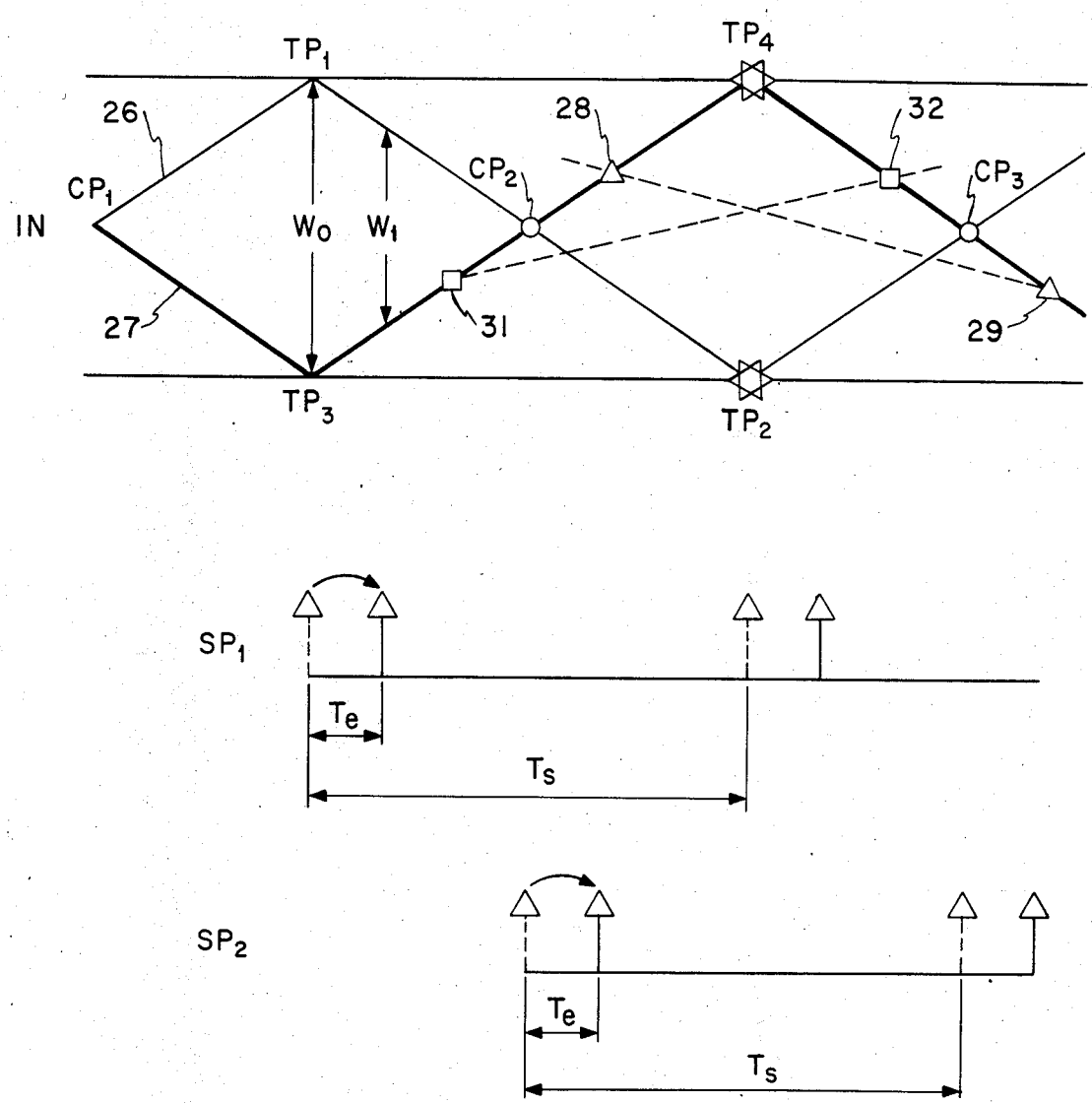
FIG. 3 is a time chart for use in describing another operation of the synchronization circuit illustrated in FIG. 1.

Referring to FIG. 3 together with FIG. 1, the illustrated rate conversion filter 22 is for use in controlling the phase shifts, such as the initial phase shift, and may be an interpolation filter for producing, as the filter output signals, a sequence of interpolated signals having a rate which is higher than the sampling rate of the sampling circuit 21. More specifically, the rate conversion filter 22 samples the input signal IN at first and second sampling time instants as illustrated at SP$_1$ and SP$_2$ in FIG. 3, respectively. The first sampling time instants SP$_1$ appear at the same sampling period T$_S$ as the main sampling time instants SP illustrated in FIG. 2. Likewise, the second sampling time instants SP$_2$ appear at the same sampling period T$_S$. However, the second sampling time instants SP$_2$ are shifted by $\pi$ relative to the first sampling time instants SP$_1$. As a result, an internal sampling rate of the rate conversion filter 22 is equal to twice the sampling period of the general conversion filter described in conjunction with FIG. 2 and produces as the filter output signal, a sequence of interpolated signals. In the manner seen from the above, the interpolated signal sequence is divisible into first and second partial interpolated signals which are sampled at the first and second sampling time instants SP$_1$ and SP$_2$, respectively.

If the first partial interpolated signals are represented by Equation (6), the second partial interpolated signals are given by:

$$s\{(m + (\tfrac{1}{2}))T_S\} = \sum_{i=-N/2}^{N/2} a\{(k-i)T_S\} \times \quad (7)$$

$$g\{\beta^{(m)} + iT_S + (T_B/2)\}.$$

In FIG. 3, an eye pattern of the input signal IN is schematically shown by a pair of parallel horizontal lines, a thin zigzag line 26, and a thick zigzag line 27. The thin zigzag line 26 intersects the thick zigzag line 27 at cross points $CP_1$, $CP_2$, and $CP_3$. The cross points $CP_1$ to $CP_3$ may be called "zero cross points". The thin zigzag line 26 touches the parallel lines at first and second points $TP_1$ and $TP_2$ while the thick zigzag line 27 touches the parallel horizontal lines at third and fourth points $TP_3$ and $TP_4$ which are opposite to the first and second points $TP_1$ and $TP_2$. Each eye is defined by $CP_1$, $CP_2$, $TP_1$, and $TP_3$ and by $CP_2$, $CP_3$, $TP_2$, and $TP_4$. A maximum width of each eye is defined between the points $TP_1$ and $TP_3$ and between the points $TP_2$ and $TP_4$ and is represented by $W_0$. The width of each eye becomes narrow from the maximum width towards each cross point, such as $CP_1$, $CP_2$, and $CP_3$, as is exemplified at $W_1$.

Let the input signal IN carry the transmission data signals of an iterative pattern of "$-1$" and "$+1$," as shown at the thick zigzag line 27. For brevity of description, it is assumed that each sampling period $T_S$ of the first and second partial interpolated signals $SP_1$ and $SP_2$ is equal to the symbol period $T_B$ of the transmission data signals carried by the input signal IN.

If the first sampling time instants $SP_1$ appear at normal time instants at which each eye exhibits the maximum width $W_0$, as shown in $SP_1$ of FIG. 3 by arrow-headed broken lines, the iterative pattern is favorably derived from the transmission data signals IN. In this event, the second sampling time instants $SP_2$ are coincident with the cross points $CP_1$ through $CP_3$, respectively, as shown in $SP_2$ of FIG. 3 at arrowheaded broken lines.

Under the circumstances, when the first sampling time instants $SP_1$ are delayed by $T_e$ (second) relative to the normal time instants, as shown at arrowheaded real lines in $SP_1$, the second sampling time instants $SP_2$ are also delayed by $T_e$, as shown at arrowheaded real lines in $SP_2$ of FIG. 3. The delay $T_e$ is representative of a phase error and may be called a phase error component.

Herein, consideration will be made about a relationship between the delay $T_e$ and amplitudes of the second partial interpolated signals. If the delay $T_e$ is equal to zero, the second sampling time instants $SP_2$ are coincident with the cross points $CP_1$ through $CP_3$, as mentioned before. The second partial interpolated signals have the same amplitudes or values at the cross points, as readily understood from $CP_2$ and $CP_3$.

It is assumed that the delay $T_e$ is smaller than zero, namely, the second sampling time instants $SP_2$ are delayed relative to the cross points, such as $CP_2$ and $CP_3$. The iterative pattern of $-1$ and $+1$ (FIG. 3) is sampled at time instants 28 and 29 which are delayed relative to the cross points $CP_2$ and $CP_3$. In this case, the amplitudes of the second partial interpolated signals are varied at the delayed time instants 28 and 29. Therefore, a difference between the amplitudes is not equal to zero.

Furthermore, it is assumed that the delay $T_e$ is greater than zero, namely, the second sampling time instants $SP_2$ are placed before the cross points $CP_2$ and $CP_3$ and that the iterative pattern is sampled at time instants 31 and 32. A difference between the amplitudes sampled at the time instants 31 and 32 is also not equal to zero and has a polarity which is inverted relative to that described in conjunction with the time instants 28 and 29.

On the other hand, let the transmission data signals be varied as are shown by the thin zigzag line 26. Therefore, the data carry a signal pattern which is inverse, in phase, to the above-mentioned iterative pattern. Consequently, signal transition takes place in the order of ($+1$, $-1$, $+1$). In this event, differences of the amplitudes are reversed in phase relative to those obtained by sampling the iterative pattern described in conjunction with the thick zigzag line 27.

This means that the polarity and a length of the delay $T_e$ can be estimated by monitoring a variation of the transmission data signals at the first sampling time instants $SP_1$, such as $TP_3$ and $TP_2$, and a difference between the amplitudes derived at the second sampling time instants $SP_2$ intermediate between the first sampling time instants $SP_1$.

Accordingly, the first sampling time instants $SP_1$ may be called "signal detection instants" while the second sampling time instants may be called "phase detection instants". In addition, the delay $T_e$ will be referred to as a phase error component.

It is preferable that both of the signal transitions, such as ($-1$, $+1$, $-1$) and ($+1$, $-1$, $+1$), are used to detect the delay $T_e$. However, no practical problem takes place even when either one of the signal transitions alone is detected, as mentioned in the referenced Unexamined Japanese Patent Publication.

Referring back to FIG. 1, the first and second partial interpolated signals are delivered to a processing circuit 35 for processing the first and second partial interpolated signals to produce an output signal OUT at a rate substantially equal to the symbol rate. The illustrated processing circuit 35 comprises a selection circuit 36 for selecting the first partial interpolated signals from the interpolated signal sequence as the output signal OUT in a manner to be described later.

In order to detect the delay, namely, phase error component $T_e$, the illustrated processing circuit 36 comprises a timing error detector 37 operable in response to the first and second partial interpolated signals. The timing error detector 37 may comprise a delay circuit, a subtractor, and a multiplier, as disclosed by Namiki in the above-referenced Unexamined Japanese Patent Publication. Specifically, the subtractor detects the differences between two adjacent ones of the first partial interpolated signals at the signal detection instants and the multiplier multiplies each difference by each amplitude detected at the phase detection instants. A product of the difference and the amplitude is representative of the phase error component $T_e$, as described in the above-mentioned publication, and is multiplied by a factor $r$ to calculate each of a time delays $r \cdot T_e$ which will be called "timing errors".

The timing errors, namely, time delays $r \cdot T_e$ delay the filter output time instants $mT_B$. Herein, it is to be noted that the timing errors $r \cdot T_e$ are successively accumulated in addition to the initial phase shift $\phi$ (FIG. 2). As a result, Equation (3) is rewritten into:

$$mT_B + \phi + \sum_{j=0}^{m-1} r \cdot T_e^{(j)} = kT_S + \beta^{(m)}, \quad (8)$$

wherein $\beta^{(m)}$ is smaller than $T_S$. As is apparent from Equation (8), the timing errors $r \cdot T_e$ and the initial phase shift can be absorbed by k and $\beta_{(m)}$.

By the use of Equation (8), Equations (6) and (7) can be rewritten into:

$$s\left(mT_B + \phi + \sum_{j=0}^{m-1} r \cdot T_e^{(j)}\right) = \sum_{i=-N/2}^{N/2} a\{(k-i)T_S\} \cdot g\{iT_S + \beta^{(m)}\} \quad (9a)$$

and $$s\left((m + (\tfrac{1}{2}))T_B + \phi + \sum_{j=0}^{m-1} r \cdot T_e^{(j)}\right) = \sum_{i=-N/2}^{N/2} a\{(k-i)T_S\} \cdot g\{iT_S + \beta^{(m)} + (T_B/2)\}. \quad (9b)$$

From Equations (9a) and (9b), it is readily understood that the first and second partial interpolated signals are controlled by the use of the timing errors $r \cdot T_e$ and that the initial phase shift $\phi$ can be absorbed by controlling the timing errors $r \cdot T_e$. Once the initial phase shift $\phi$ is absorbed, a sum of the timing errors $r \cdot T_e$ is given by:

$$-\sum_{j=0}^{m-1} r \cdot T_e^{(j)} \approx \phi.$$

Under the circumstances, the timing error detector 37 successively delivers the timing errors $r \cdot T_e$ to a calculation circuit 38 and a reference time generator 39. The illustrated calculation circuit 38 adds $(T_B/2)$ to each timing error $r \cdot T_e$ to calculate a sum of $(r \cdot T_e$ and $(T_B/2))$ and supplies the rate conversion filter 22 with each timing error $r \cdot T_e$ and the above-mentioned sum.

Responsive to the timing errors $r \cdot T_e$, the reference time generator 39 controls a time instant at which the following interpolated signal is produced as the output signal OUT from the selection circuit 36. Specifically, the reference time generator 39 delivers a selection signal to the selection circuit 36 when a time interval $(T_B + r \cdot T_e)$ lapses. Consequently, only the first partial interpolated signals are selected by the selection circuit 36 and produced as the output signal OUT.

Figure 4:
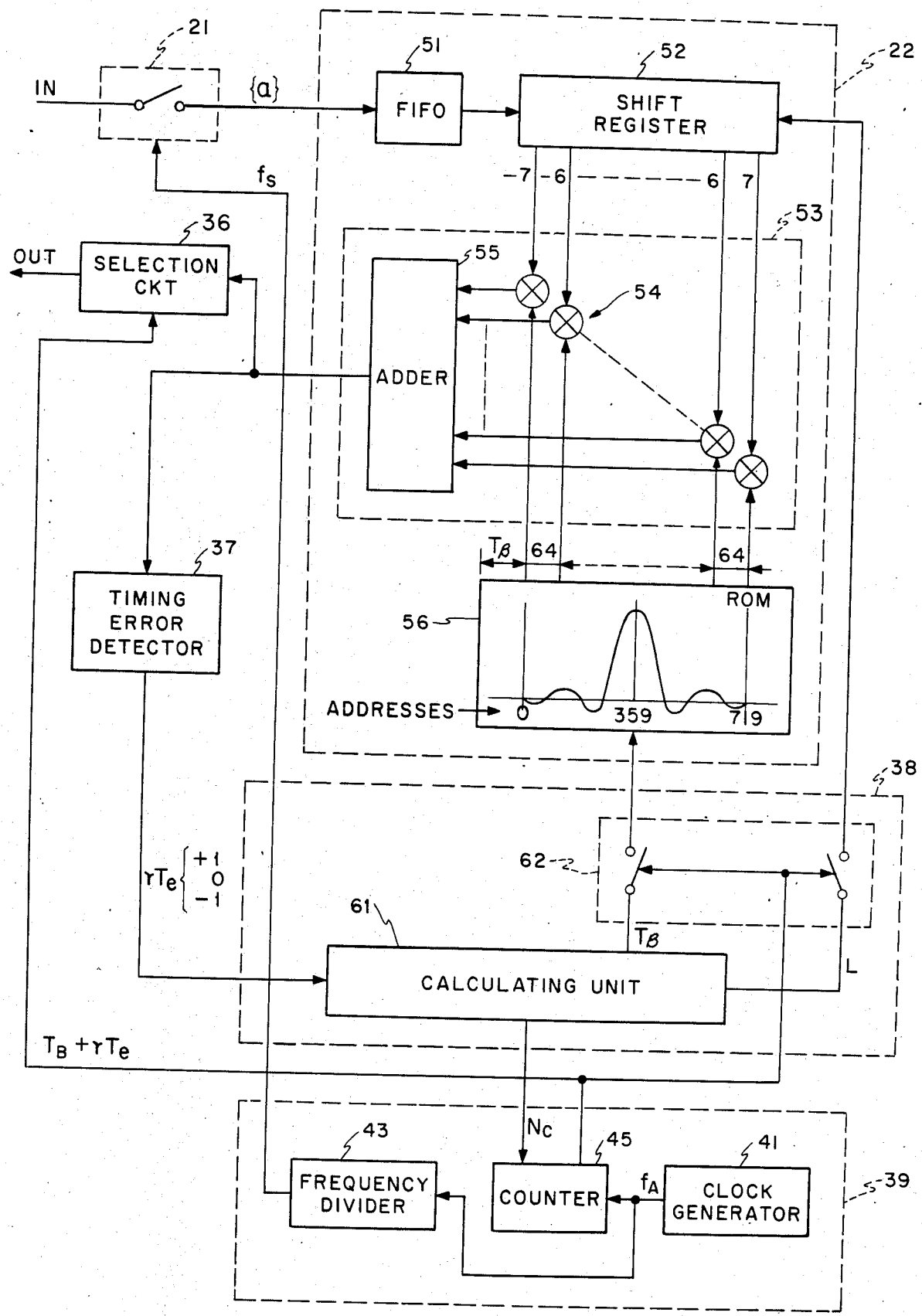
FIG. 4 is a block diagram of a synchronization circuit according to a more preferred embodiment of this invention.

Referring to FIG. 4, a synchronization circuit according to a more preferred embodiment of this invention comprises similar parts and signals designated by like reference numerals and symbols. The illustrated synchronization circuit is supplied with the input signal IN carrying the transmission data signals which have a symbol rate of 32 kHz. The symbol rate may be indicated at $f_B$ hereinunder.

The sampling circuit 21 samples the input signal IN by the main sampling signal which has an invariable sampling frequency or rate $f_S$ of 45 kHz. In the example being illustrated, the main sampling signal is supplied from the reference signal generator 39. For this purpose, the reference signal generator 39 comprises a clock generator 41 for generating a clock signal of a clock frequency $f_A$ and a frequency divider 43 for frequency dividing the clock frequency $f_A$ into the main sampling frequency $f_S$. In addition, the reference signal generator 39 further comprises a counter 45 which is operated in a manner to be described later.

Let the clock frequency $f_A$ be equal to a common multiple of the sampling rate $f_S$ and the symbol rate $f_B$. Accordingly, the clock frequency $f_A$ is represented by $q \cdot f_B \cdot f_S$, where q is an integer. Herein, it is assumed that q is equal to two and, as a result, the clock frequency $f_A$ is equal to 2,880 kHz.

Thus, the clock frequency $f_A$ of the clock generator 41 is frequency divided into the sampling rate $f_S$ of 45 kHz by the frequency divider 43. The frequency divider 43 therefore has a factor equal to $1/(2f_B)$.

At any rate, the input signal IN is sampled at the sampling rate $f_S$ of 45 kHz by the sampling circuit 21 and is sent as the sampled signal sequence {a} to the rate conversion filter, namely, interpolator 22. The illustrated rate conversion filter 22 is of a nonrecursive type, as will become clear as the description proceeds.

The interpolator 22 comprises a first-in first-out (FIFO) memory 51 for successively storing the sampled signal sequence at the sampling rate $f_S$ of 45 kHz to produce a sequence of stored signals at the symbol rate $f_B$ of 32 kHz. The stored signal sequence is therefore asynchronous with the sampled signal sequence {a} given to the memory 51. The remaining parts of the interpolator 22 are operable at an operation period equal to the symbol rate $f_B$. The stored signal sequence is successively memorized into a shift register 52 for the stored signal sequence of a data length N. In other words, the shift register 52 has a plurality of stages equal to the data length N. The stages of the illustrated shift register 52 are equal in number to fourteen and are numbered from −7 to 7 in FIG. 4. Stage output signals are produced from the respective stages similar to tap output signals of a transversal filter.

A local calculation circuit 53 comprises a plurality of multipliers equal in number to fourteen and collectively the indicated at 54 and an adder 55 for calculating a total sum of products given from the respective multipliers 54.

The multipliers 54 are connected to a read-only memory 56 which stores coefficients which are representative of the impulse response g(t) sampled at the clock frequency $f_A$ and which will be called tap coefficients. The read-only memory 56 has a plurality of addresses which are equal in number to 720 so as to store the tap coefficients equal in number to 720. The read-only memory 56 selects fourteen of the tap coefficients at a time in a manner to be described later to send the fourteen tap coefficients to the multipliers 54. Each of the fourteen tap coefficients is read out of the read-only memory 56 at every sixty-fourth address, as illustrated in FIG. 4.

At any rate, the multipliers 54 calculate the products of the stage output signals and the fourteen tap signals, respectively. The adder 55 calculates the total sum of the products. The total sum of the products is represented by Equations (9a) and (9b) and is therefore representative of the interpolated signal sequence.

The total sum of the products is delivered as the interpolated signal sequence to the selection circuit 36 and to the timing error detector 37. The selection circuit 36 may be a latch, as will be described later. The timing error detector 37 supplies the timing error $r \cdot T_e$ to the calculation circuit 36. The illustrated calculation circuit 38 comprises a calculating unit 61 and a switch circuit 62 both of which will be described later in detail. The illustrated calculating unit 61 is coupled to the counter 45 of the reference time generator 39. Thus, the counter 45 is controllable by the calculating unit 61 and produces a switching signal at every time interval of $(T_B + r \cdot T_e)$, as in FIG. 1. Thus, the switching signal is produced at each period ($T_B + r \cdot T_e$) which may be referred to as a "modified symbol period".

The switching signal is sent to the selection circuit 36 to select the first partial interpolated signals as the output signal OUT. The switching signal is also sent to the switching circuit 62 to connect the calculating unit 61 to the read-only memory 56 and the shift register 52.

The operation of the synchronization circuit will be described more in detail.

In the illustrated synchronization circuit, the clock frequency $f_A$ is equal to 2,880 kHz, as mentioned before. Therefore, a minimum controllable time or clock period $T_A$ is represented by $1/f_A$ and each clock signal is counted at every clock period $T_A$. This means that the clock signals are counted to 90 and 64 during the symbol period $T_B$ and the sampling period $T_S$, respectively.

The interpolator 22 delivers, as the sum of the products, the interpolated signal sequence to the timing error detector 37, as mentioned before. The interpolated signal sequence is equivalent to that sampled at the first and second sampling time instants $SP_1$ and $SP_2$ in FIG. 3.

Now, let the interpolated signal sequence be calculated in the form of the sum of products by the interpolator 22 and delivered to the selection circuit 36 and the timing error detector 37. In addition, let the selection circuit 36 be loaded with the first partial interpolated signals. Responsive to the interpolated signal sequence, the timing error detector 37 produces the timing error $r \cdot T_e$ in the manner described in conjunction with FIGS. 1 through 3. In the example being illustrated, the timing error $r \cdot T_e$ takes either one of $+1$, $0$, and $-1$ in accordance with the phases of the second partial interpolated signals, as mentioned before. Each value of the timing error $r \cdot T_e$ is indicative of an increment or decrement for modifying the normal symbol period $T_B$.

The illustrated calculating unit 61 indicates the first and second time instants $SP_1$ and $SP_2$ (FIG. 3) in response to the timing error $r \cdot T_e$. The first and second time instants $SP_1$ and $SP_2$ are given by the time differences $\beta$ between the main sampling time instants SP and the first and second sampling instants $SP_1$ and $SP_2$ (FIG. 3).

In addition, the number L of the sampled signals $\{a\}$ should be considered to calculate the respective time differences $\beta$ because the sampling rate ($f_S$) is different from the symbol rate ($f_B$) in the illustrated example. In FIG. 2, an estimated number $L^{(2)}$ of the sampled signals $\{a\}$ is given by:

$$L^{(2)} = \text{int}\{(T_B + \beta^{(1)})/T_S\},$$

where int $\{x\}$ is indicative of an integer part of x.

In general, the normal symbol period $T_B$ is modified into ($T_B + r \cdot T_e$) in response to the timing errors $r \cdot T_e$. Accordingly, the estimated number $L^{(m)}$ may be represented by:

$$L^{(m)} = \text{int}\{(T_B + r \cdot T_e^{(m-1)} + \beta^{(m-1)})/T_S\}. \tag{10}$$

Under the circumstances, the time difference $\beta(2)$ of FIG. 2 is given by:

$$\beta^{(2)} = T_B + \beta^{(1)} - L_2 T_S,$$

When each time difference $\beta^{(m)}$ is calculated in the digital form, the time difference $\beta^{(m)}$ may be replaced by $T_\beta^{(m)}$. The digital time delays $T_\beta^{(m)}$ are given by:

$$T_m\beta = 90 + T_\beta^{(m-1)} - 64 L^{(m)} + r \cdot T_e + \begin{Bmatrix} 0 \\ 45 \end{Bmatrix}. \tag{11}$$

In Equation (11), the first sampling time instants $SP_1$ are specified by an addition of a zero while the second sampling time instants $SP_2$ are specified by an addition of 45. Thus, the illustrated calculating unit 61 calculates the estimated number $L^{(m)}$ and the digital time delay $T_\beta^{(m)}$ in accordance with Equations (10) and (11), respectively.

Furthermore, the calculating unit 61 times each symbol period which may be indicated by counting the clock frequencies $f_A$.

When each modified symbol period is represented by a count $N_C$, the count $N_C$ is equal to 89, 91, or 90 in consideration of the timing error $r \cdot T_e$. Such a calculating unit 61 may be a microprocessor.

The count $N_C$ is sent to the counter 45 of the reference time generator 39. As a result, the counter 45 is set to the count $N_C$. The counter 45 is counted down one by one in response to the clock signals supplied from the clock generator 41 and delivers the switching signal to the selection circuit 36 and the switching circuit 62 each time when the counter 45 is counted down to zero. Responsive to the switching signal, the selection circuit 36 selects the first partial interpolated signals from the interpolated signal sequence as the output signal OUT.

On the other hand, the switching circuit 62 is closed in response to the switching signal. During closure of the switching circuit 62, the estimated number $L^{(m)}$ of the sampled signals $\{a\}$ is sent to the shift register 52 of the interpolator 22. The calculating unit 61 successively supplies the read-only memory 56 with a pair of the digital time delays $T_\beta^{(m)}$ which indicate the first and second sampling time instants and which may be called "first and second digital delays" while the calculating unit 61 is connected to the read-only memory 56. Thus, the first and second digital delays $T_\beta^{(m)}$ may be stored in a buffer memory (not shown) included in the interpolator 22.

Referring to FIG. 5 together with FIG. 4, the shift register 52 is loaded with fourteen sampled signals which are numbered from 1 to 14. It is assumed that the first digital delay $T_\beta$ is given to the read-only memory 56 and that the timing error $r \cdot T_e$ is rendered equal to zero. In addition, it is also assumed that the first digital delay $T_\beta$ indicates a forty-third one of the addresses of the read-only memory 56. As a result, eleven tap coefficients are read out of the addresses, such as 107, 171, . . . , 683, arranged from the forty-third address at every sixty-fourth address. Under the circumstances, let a current one of the interpolated signals be calculated by the interpolator 22.

Subsequently, the estimated number L and the first digital delay $T_\beta$ of the following one of the interpolated signals are calculated in the calculating unit 61 in accordance with Equations (10) and (11), respectively, and are kept in the calculating unit 61. In this case, the estimated number L and the first digital delay $T_\beta$ are equal to 2 and 5, respectively.

Similar calculations are carried out in the interpolator 22 and the calculating unit 61 in connection with the second digital delay $T_\beta$ with the shift register 52 kept unchanged. In other words, only the addresses of the read-only memory 52 are shifted by 45 in response to the second digital delay $T_\beta$.

Referring to FIG. 6 together with FIGS. 4 and 5, the estimated number L and the digital delay $T_\beta$ are sent to the shift register 52 and the read-only memory 56, respectively, on production of the following interpolated signal. Inasmuch as the estimated number L is equal to 2, the shift register 52 is shifted by two stages rightwards of FIG. 5 and is loaded with two novel sampled signals 15 and 16, as illustrated in FIG. 6. As a result, the sampled signals 1 and 2 are shifted out of the shift register 52.

On the other hand, the read-only memory 56 is supplied with the first digital delay $T_\beta$ which is indicative of 5 as an address signal. Therefore, twelve tap coefficients are read out of selected addresses arranged from the fifth address specified by the digital time delay $T_\beta$ at every sixty-fourth address.

In the example being illustrated, the timing error $r \cdot T_e$ is equal to zero. Accordingly, a time interval between the current and the following interpolated signals is equal to 90 when specified by the number of the clock signals. The number 90 corresponds to the symbol period $T_B$. Under the circumstances, the tap coefficients are read out of the addresses shifted by 90 when the following interpolated signal is calculated. For example, a twelfth one $a_{12}$ of the sampled signals $\{a\}$ is multiplied by a tap coefficient read out of a forty-third one of the addresses in FIG. 5. In FIG. 6, the tap coefficient for the twelve sampled signal $a_{12}$ is read out of the addresses "133" on production of the following interpolated signal. Thus, each address for the tap coefficients is shifted by ninty addresses at every symbol period $T_B$.

Figure 7:
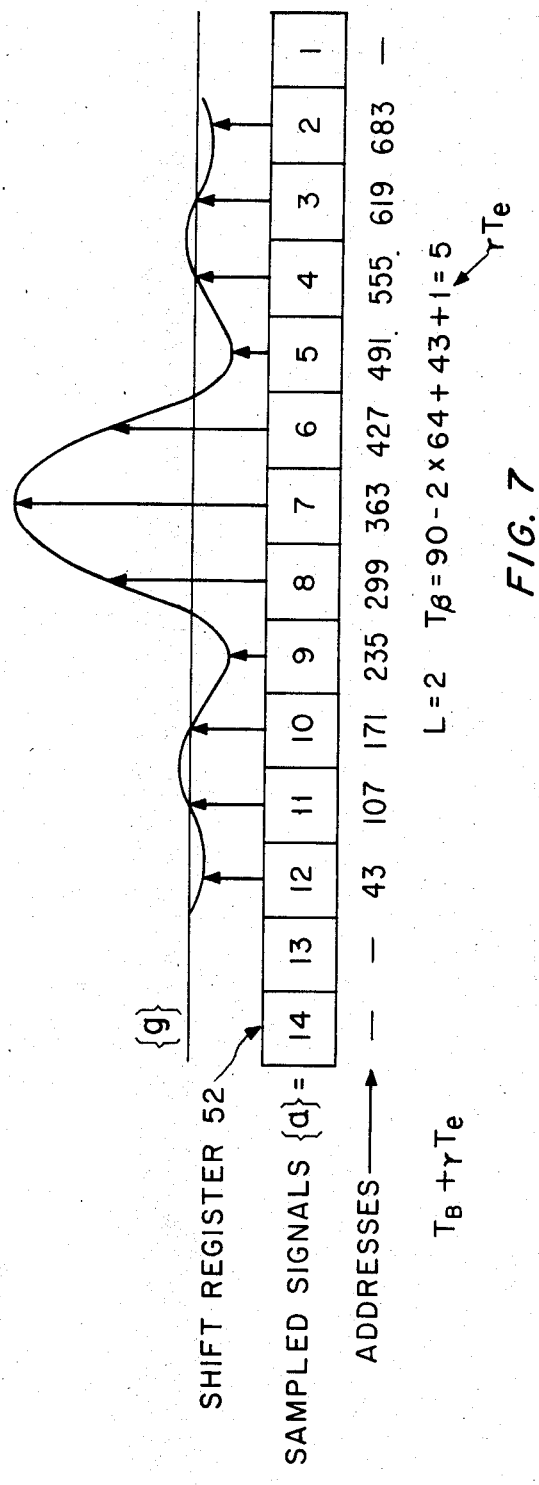
FIG. 7 is a view for use in describing that operation of the synchronization circuit which is carried out under another condition in response to a current interpolated signal.
Figure 8:
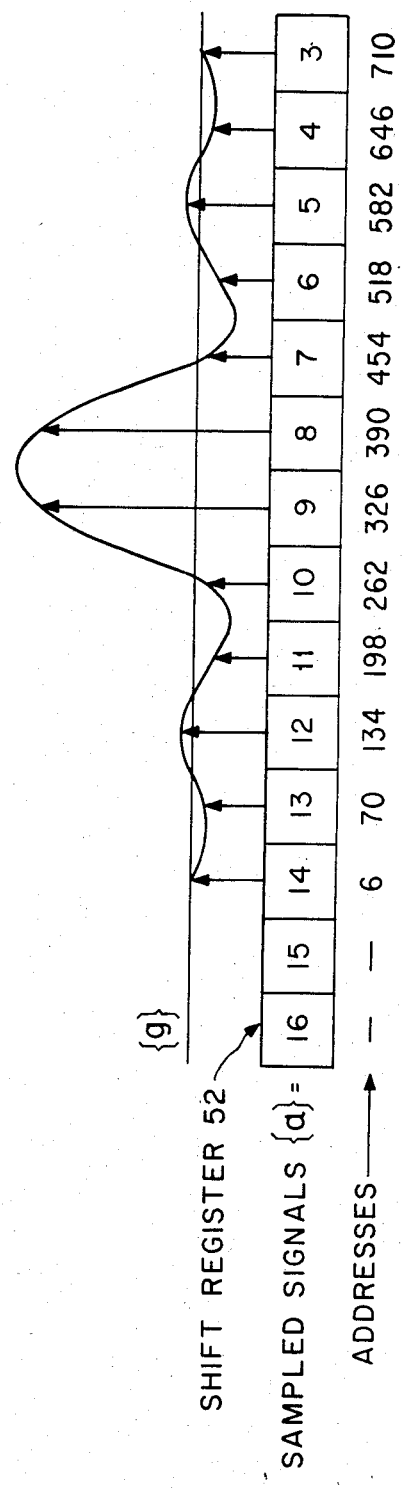
FIG. 8 is a view for use in describing that operation of the synchronization circuit which is carried out under another condition in response to the following interpolated signal.

Referring to FIGS. 7 and 8, it is assumed that the liming error $r \cdot T_e$ is equal to $+1$. A current interpolated signal is calculated in the manner described in conjunction with FIGS. 5 and 6. The estimated number L of the sampled signals $\{a\}$ and the digital time delay $T_\beta$ are also calculated with the sampled signals $\{a\}$ stored in the shift register 52 as shown in FIG. 7 and are equal to 2 and 6 in consideration of the timing error $r \cdot T_e$.

In this event, a tap coefficient for the twelfth sampled signal $a_{12}$ is read out of the address "43" on calculation of the current interpolated signal and is read out of the address "134" on calculation of the following interpolated signal. Thus, the addresses for each sampled signal are changed by ninty-one addresses at every symbol period. Thus, the symbol period is modified into $(T_B + r \cdot T_e)$.

As mentioned before, the first and second digital delays $T_\beta$ are for separating the interpolated signal sequence into the first and second partial interpolated signals and will be called "first and second internal control signals", respectively. The switching circuit 62 delivers the first and second digital delays $T_\beta$ to the interpolator 22 and may be referred to as a delivery circuit.

Figure 9:
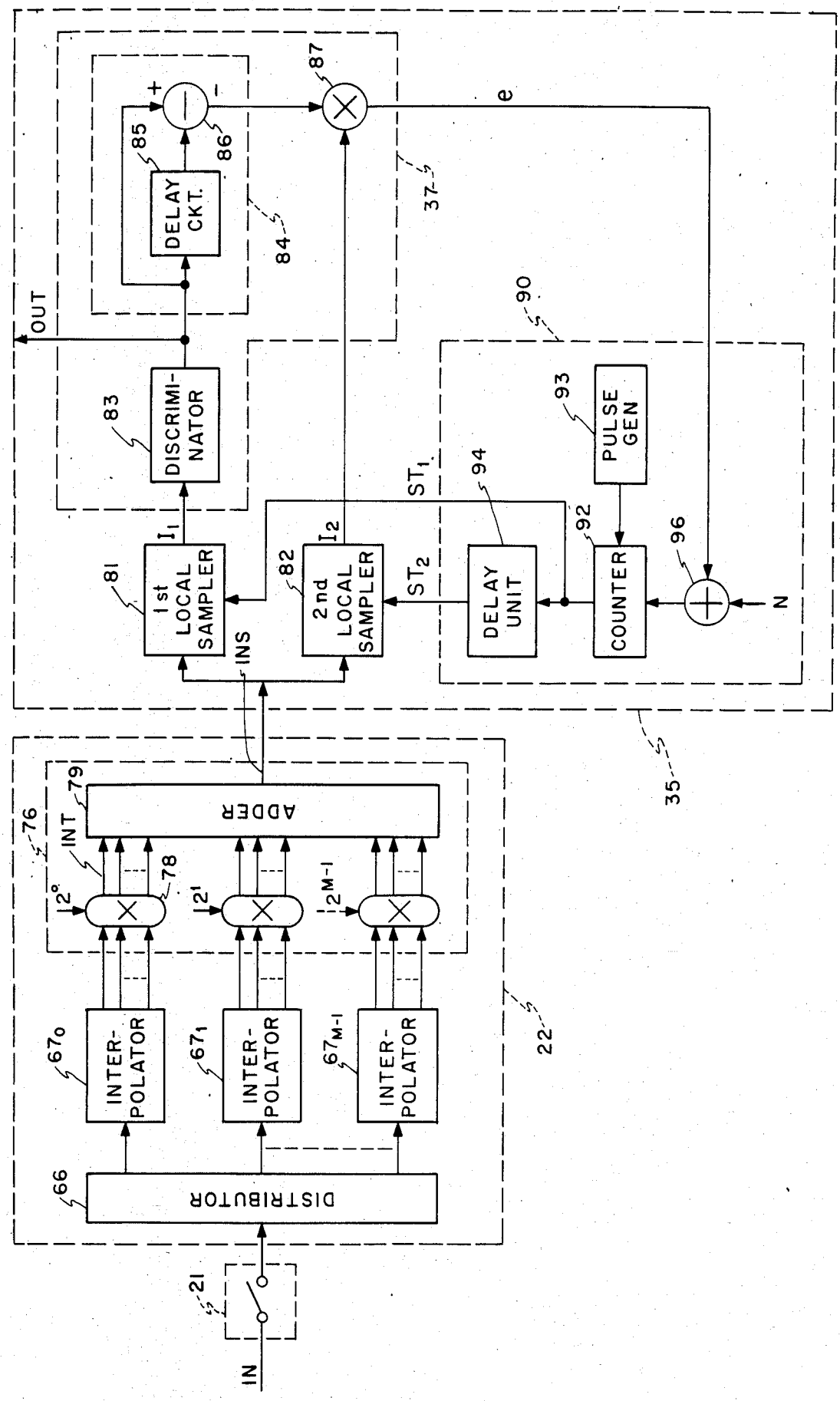
FIG. 9 is a block diagram of a synchronization circuit according to a third embodiment of this invention.

Referring to FIG. 9, a synchronization circuit according to a second embodiment of this invention comprises similar parts and signals designated by like reference numerals and symbols. As in FIGS. 1 and 4, the input signal IN carries the transmission data signal at the symbol rate and is sampled by the sampling circuit 21 at the main sampling period $T_S$ which may be different from the symbol period $T_B$. The main sampling period $T_S$ is equal to a reciprocal of the sampling frequency $f_S$. As a result, the sampling circuit 21 supplies the rate conversion filter 22 with the sampled signal sequence $\{a\}$.

In the example being illustrated, it is surmised that each of the sampled signals $\{a\}$ has a multi-level V. The multi-level V can be represented by:

$$V = \sum_{i=0}^{M-1} a_i \cdot 2^i, \quad (12)$$

where $a_i$ takes either one of 0 and 1. In other words, the level V can be represented by Zero through $(M-1)$ bits or by a vector composed of M elements $(a_{M-1}, a_{M-2}, \ldots, a_0)$.

Let linear mapping of the multi-level V be carried out by the use of a function G to produce an output signal F. A relationship between the output signal F and the linear mapping G is give in consideration of Equation (12) by:

$$\begin{aligned} F &= G(V) \quad (13) \\ &= G\left(\sum_{i=0}^{M-1} a_i \cdot 2^i\right) \\ &= G(a_0) + G(a_1 \cdot 2^1) + \ldots + G(a_{M-1} \cdot 2^{M-1}) \\ &= G(a_0) + 2 \cdot G(a_1) + \ldots + 2^{M-1} \cdot G(a_{M-1}) \\ &= \sum_{i=0}^{M-1} 2^i \cdot G(a_i). \end{aligned}$$

From Equation (13), it is understood that the multi-level V can be mapped by individually mapping the respective elements $a_i$ to produce zero through $(M-1)$ individual output signals and by combining the individual output signals in accordance with Equation (13). If the function G is an impulse response, Equation (13) can be realized by the use of a combination of elementary interpolators for the respective elements $a_i$. The zero through $(M-1)$ individual output signals may be named zero through $(M-1)$ fragmentary interpolated signals, respectively.

The illustrated rate conversion filter 22 comprises a distributor 66 for dividing each sampled signal $\{a\}$ into the zero through $(M-1)$ bits or elements $a_0$ to $a_{M-1}$. The first through $(M-1)$ elements are individually supplied to zero through $(M-1)$ elementary interpolators $67_0$ to $67_{M-1}$, respectively. Each of the elementary interpolators 67 (suffixes omitted) is similar in structure and operation. Accordingly, a description will mainly be made only about a single one of the elementary interpolators 67.

Figure 10:
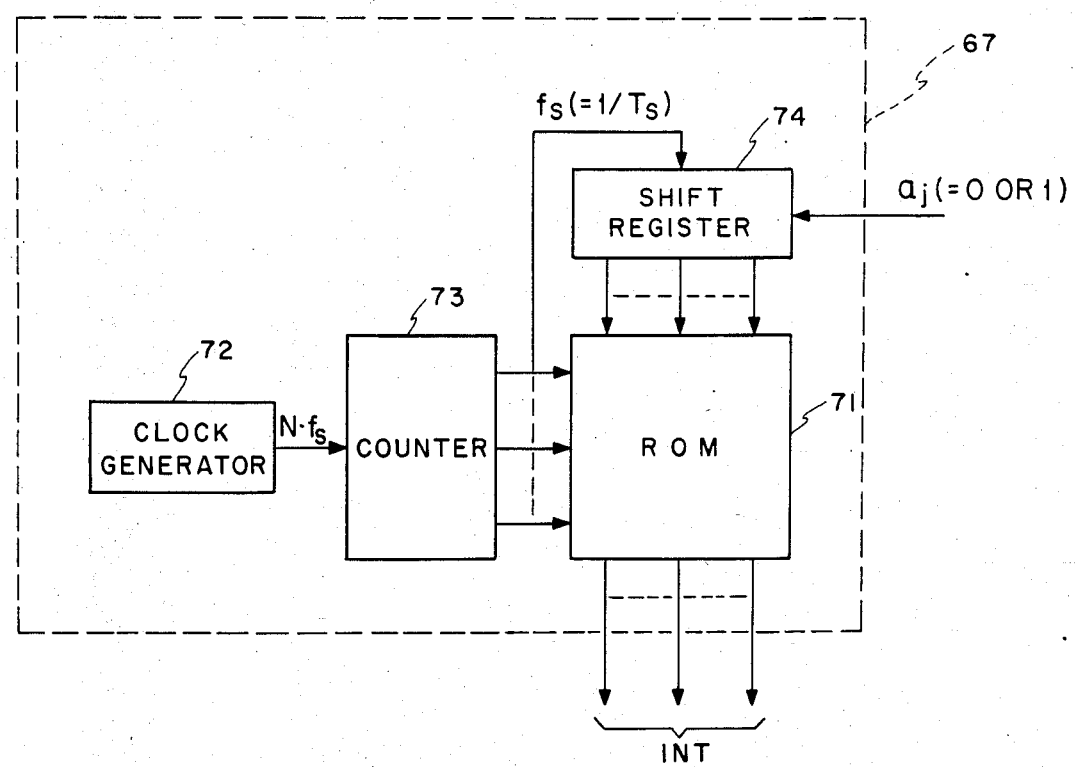
FIG. 10 is a block diagram of an elementary interpolator illustrated in FIG. 9.

Temporarily referring to FIG. 10, the elementary interpolator 67 comprises a read-only memory (ROM) 71 storing an impulse response for a binary signal. A clock generator 72 generates a clock signal having a clock frequency equal to N times the sampling frequency $f_S$. A counter 73 successively counts the clock signals to $N-1$. The counter 73 is reset each time when the clock signals are counted to N and supplies a shift register 74 with a shift pulse having a frequency equal to the sampling frequency $f_S$. The shift register 74 is successively loaded with the sampled signals $a_i$ in synchronism with the shift pulse. Simultaneously, the contents of the shift register 74 are shifted at every shift pulse one by one.

Under the circumstances, the read-only memory 71 produces a sequence of the fragmentary or local interpolated signals INT, N in number, during each sampling period $T_S$ in accordance with a count of the counter 73.

Referring back to FIG. 9, the fragmentary interpolated signals INT are sent from the respective elementary interpolators $67_i$ to a combination circuit 76. The combination circuit 76 comprises multipliers 78, M in number, for multiplying the local interpolated signals INT by weights $2^0$ to $2^{M-1}$ to calculate zero through $(M-1)$ products, respectively. An adder 79 adds the zero through $(M-1)$ products to one another to calculate a sum thereof. The sum of the zero through $(M-1)$ products is representative of an interpolated value for the multi-level V, as readily understood from Equation (13) and is produced as an interpolated signal INS. The interpolated signal INS is successively sent to the processing circuit 35 like in FIGS. 1 and 4.

It is to be noted here that the interpolated signal sequence INS exhibits an eye pattern similar to that illustrated in FIG. 3. The interpolated signal sequence INS carries the transmission data signal at the symbol rate. This means that a phase error signal or timing error $r \cdot T_e$ can be calculated by sampling the interpolated signal sequence INS by the first and second sampling time instants $SP_1$ and $SP_2$ which have phases which are different from each other by $\pi$, as illustrated in FIG. 3.

Under the circumstances, the illustrated processing circuit 35 comprises first and second local samplers 81 and 82 for subsampling the interpolated signal sequence INS in response to first and second timing signals $ST_1$ and $ST_2$ which determine the first and second sampling time instants $SP_1$ and $SP_2$, respectively. The first and second timing signals are produced in a manner to be described later.

At any rate, the first and second local samplers 81 and 82 produce first and second partial interpolated signals $I_1$ and $I_2$ which are sampled at the first and second sampling time instants $SP_1$ and $SP_2$, respectively. Thus, the interpolated signal sequence INS is divided into the first and second partial interpolated signals $I_1$ and $I_2$ by the first and second local samplers 81 and 82, respectively.

The first and second partial interpolated signals $I_1$ and $I_2$ are sent to a timing error detector 37 which may be similar to that illustrated in FIGS. 1 and 4. More specifically, the illustrated timing error detector 37 comprises a discriminator 83 for discriminating the first partial interpolated signals $I_1$ to produce a sequence of discriminated signals each of which is representative of each symbol of the transmission data signals. The discriminated signal sequence is delivered as the output signal OUT to an external device (not shown) and also to a differentiator 84.

The differentiator 84 comprises a delay circuit 85 for delaying each of the discriminated signals for a duration equal to the symbol period $T_B$ to produce a sequence of delayed discriminated signals. A subtractor 86 subtracts the discriminated signals from the delayed discriminated signals to produce difference signals representative of the differences therebetween. The differences are indicative of variations between two adjacent ones of the symbols.

The difference signals are multiplied by the second partial interpolated signals $I_2$ in a multiplier 87 to calculate products of the difference signals and the second partial interpolated signals $I_2$. The products are representative of the timing errors $r \cdot T_e$ and are sent as an internal control signal e to a timing controller 90. Thus, the internal control signal e is dependent on the output signals and the timing error detector 37 may be called a local processing circuit for processing the first and second partial interpolated signals $I_1$ and $I_2$ to produce the internal control signal e. The internal control signal e may be referred to as a "local control signal".

In the timing controller 90, an adder 91 adds each time delay represented by the internal or local control signal e to a preselected number N equal to the number of the clock pulses which are produced during the normal symbol period $T_B$. A sum of the timing error and the preselected number may be represented by $N_C$ and is delivered from the adder 91 to a counter 92. The counter 92 is set to the sum $N_C$ and counted down by a sequence of pulses sent from a pulse generator 93. A counter output signal is produced from the counter 92 each time when the counter 92 is counted down to zero. The counter output signal is delivered direct 14 to the first local sampler 81 as the first timing signal $ST_1$ while the counter output signal is delivered to the second local sampler 82 through a delay unit 94 as the second timing signal $ST_2$. Inasmuch as the delay unit 94 provides a delay equal to a half of the symbol rate $T_B$, the first and second timing signals $ST_1$ and $ST_2$ are indicative of the first and second sampling instants $SP_1$ and $SP_2$, respectively.

The timing error detector 37 and the reference time generator 39 are described in the above-referenced Japanese Unexamined Patent Publication. Therefore, the description will be omitted from the instant specification about the timing error detector 37 and the reference time generator 39.

The illustrated processing circuit 35 makes the first and second sampling instants $SP_1$ and $SP_2$ coincide with a center point of each eye and each zero cross point, such as $CP_1$, $CP_2$ (FIG. 3), which is intermediate between two center points of the adjacent eyes.

Figure 11:
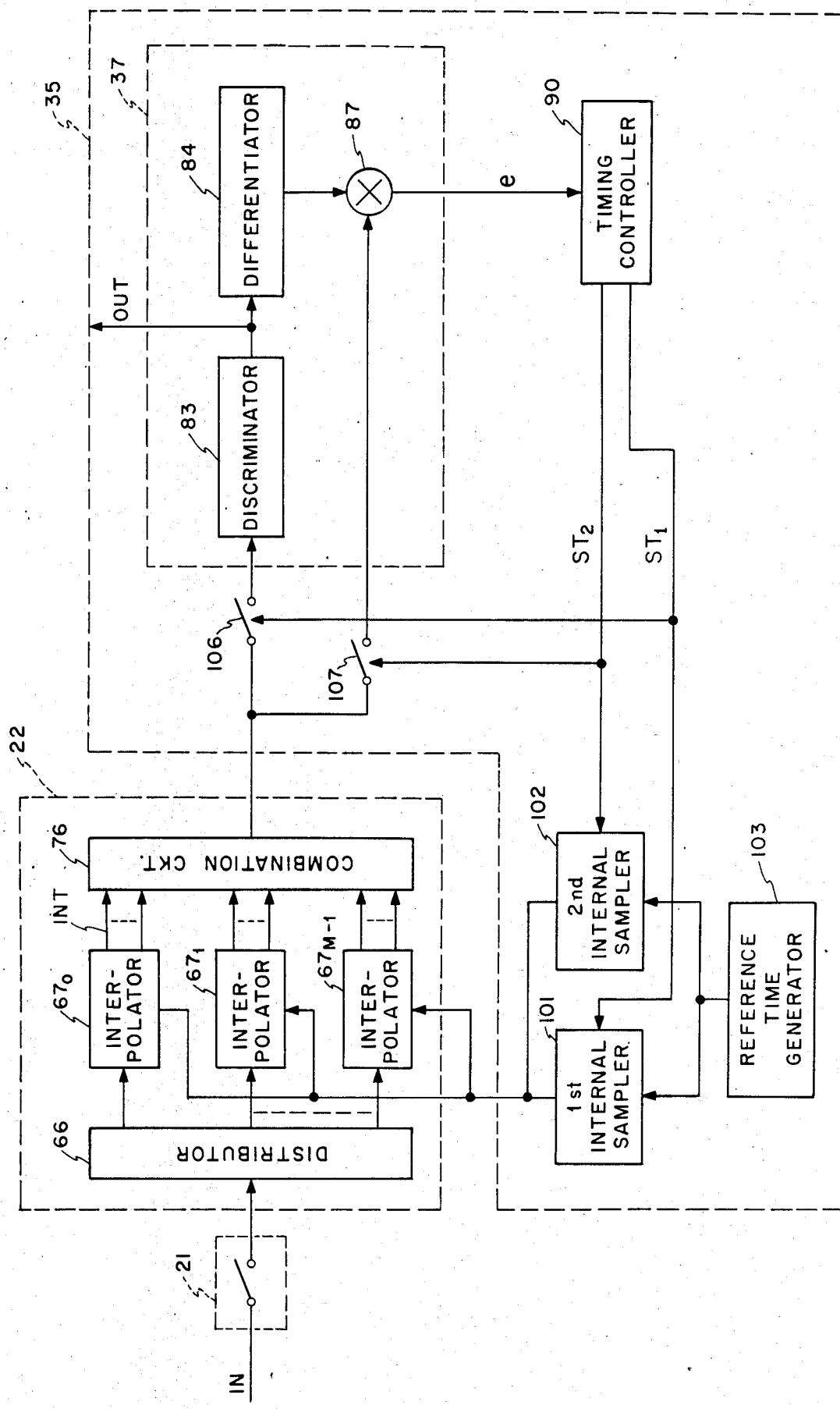
FIG. 11 is a block diagram of a synchronization circuit according to a fourth embodiment of this invention.

Referring to FIG. 11, a synchronization circuit according to a third embodiment of this invention is similar to that illustrated in FIG. 9 except that each of the elementary interpolators $67_0$ to $67_{M-1}$ is controlled by first and second internal samplers 101 and 102 which are controlled by a reference time generator 103 and that first and second distribution switches 106 and 107 are substituted for the first and second local samplers 81 and 82 illustrated in FIG. 9. The timing error detector 37 and the timing controller 90 are similar to those illustrated in FIG. 9, respectively.

In any event, the first and second timing signals $ST_1$ and $ST_2$ are produced from the timing controller 90 in the manner illustrated in FIG. 9 and sent to the first and second distribution switches 106 and 107, respectively, and also to the first and second internal samplers 101 and 102, respectively. The first and second internal samplers 101 and 102 are supplied with a sequence of a reference time signals from the reference time generator 103. The reference time generator 103 may be a counter similar to that illustrated in FIG. 10.

Each of the first and second internal samplers 101 and 102 comprises a latch for storing each of the reference time signals until reception of the following reference time signal. Responsive to each of the first and second timing signals $ST_1$ and $ST_2$, the latch is triggered by each timing signal and produces the stored reference time signal. Anyway, the first and second internal samplers 101 and 102 deliver first and second sampler output signals to the elementary interpolators 67. Each of the first and second sampler output signals is representative of the reference time signal which is stored in the latch when each timing signal $ST_1$ and $ST_2$ is received. The second sampler output signal is delayed by a half of the symbol period $T_B$ relative to the first sampler output signal. Therefore, the first and second sampler output signals may be referred to as "timing control signals" for controlling sample time instants.

As in FIG. 9, the zero through (M−1) elementary interpolators $67_0$ to $67_{M-1}$ are supplied with the zero through (M−1) elements of each sampled signal through the distributor 66.

Figure 12:
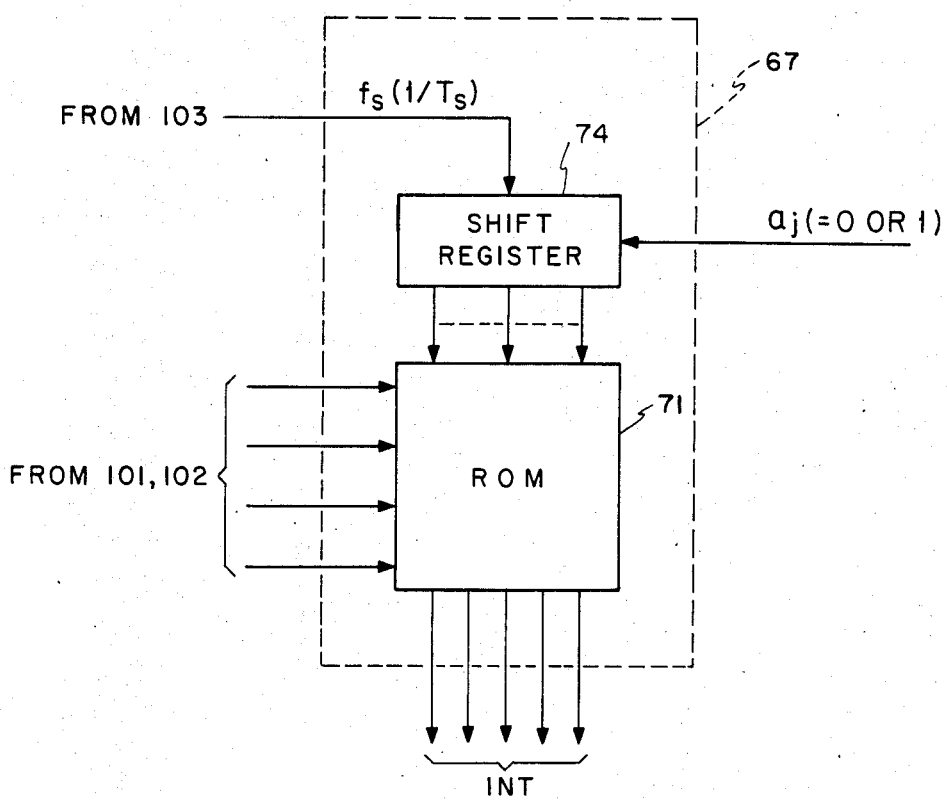
FIG. 12 is a block diagram of an elementary circuit for use in the synchronization circuit illustrated in FIG. 11.

Referring to FIG. 12 together with FIG. 11, the illustrated elementary interpolator 67 is similar to that illustrated in FIG. 10 except that the read-only memory 71 (FIG. 12) is supplied with the first and second sampler output signals from the first and second internal samplers 101 and 102 and that the shift register 74 is supplied with a shift pulse from the reference time generator 103 at the sampling frequency $f_S$.

The read-only memory 71 produces the fragmentary or local interpolated signal in response to the first and second sampler output signals and the contents stored in the shift register 74 in the manner described in conjunction with FIG. 10.

In FIG. 11, the respective fragmentary interpolated signals are combined by the combination circuit 76 into the interpolated signal sequence INS in the above-mentioned manner. The first and second distribution switches 106 and 107 alternatingly deliver the interpolated signal sequence INS to the discriminator 83 and the multiplier 87 in response to the first and second switching signals $ST_1$ and $ST_2$. The timing error detector 37 produces the internal control signal e which is representative of the timing error or phase error like in FIG. 9.

With this structure, each read-only memory of the elementary interpolators 67 is accessed only twice in each symbol period $T_B$. Therefore, each interpolator 67 carries out operation at a high speed in comparison with that illustrated in FIG. 9.

In the meanwhile, let a quadrature amplitude modulated signal be supplied as the input signal IN to the synchronization circuit illustrated in FIGS. 9 and 11. In this event, each sampled signal is represented by a complex number and therefore divisible into a real part component and an imaginary part component. Although a similar operation is possible by using either one of the real and imaginary part components, it is preferable to use both of the real and imaginary part components. When both of the real and imaginary part components are used to carry out the above-mentioned operation, the rate conversion filter 22, discriminator 83, and differentiator 84, which are illustrated in FIGS. 9 and 11, may be for processing such a complex number. In addition, the first and second local samplers 81 and 82 illustrated in FIG. 9 may be for dealing with a complex number.

Under the circumstances, each of the differentiator 84 and the second local sampler 82 (FIG. 9) produces a complex signal composed of a real and an imaginary part. Likewise, the second distribution switch 107 (FIG. 11) also produces a complex signal. Therefore, the multiplier 87 (FIGS. 9 and 11) can process such complex signals supplied from the differentiator 84 and the second local sampler 82 (FIG. 9) or from the differentiator 84 and the second distribution switch 107 (FIG. 11).

Figure 13:
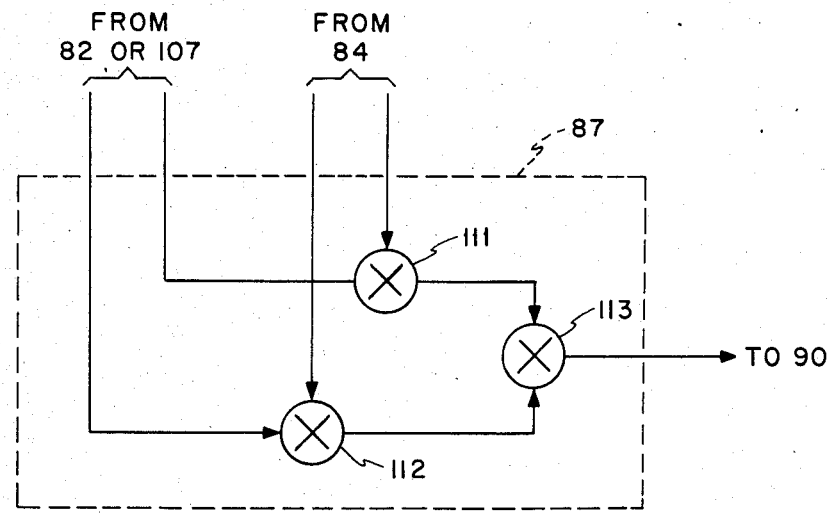
FIG. 13. is a block diagram of a complex multiplier for use in the synchronization circuit illustrated in FIGS. 9 and 11.

Referring to FIG. 13, the multiplier 87 comprises a first local multiplier 111 for carrying out multiplication of the real parts of the complex signals to produce a first product of the above-mentioned real parts and a second local multiplier 112 for carrying out multiplication of the imaginary parts of the complex signals to produce a second product of the imaginary parts. A local adder 113 adds the first product to the second product to calculate a sum of the first and second products. The sum is supplied as the internal control signal e to the timing controller 90.

While this invention has thus far been described in conjunction with a few embodiments thereof, it will readily be possible for those skilled in the art to put this invention into practice in various other manners. For example, the sampling period $T_S$ of the sampling circuit 21 may be equal to the symbol period $T_B$.

What is claimed is:

1. A synchronization circuit responsive to an input signal carrying a transmission data signal and being received at a transmission rate for producing an output signal which is representative of reproductions of said transmission data signal, said circuit comprising:

sampling means responsive to said input signal for sampling it at a predetermined sample rate to produce a sequence of sampled signals at said predetermined sample rate;

interpolating means coupled to said sampling means for interpolating said sampled signal sequence to produce an interpolated signal sequence; and processing means coupled to said interpolating means for processing said interpolated signal sequence to produce said output signal at said transmission rate;

said interpolating means comprising:

storage means for successively storing said sampled signal sequence at said predetermined sample rate to produce a sequence of stored signals at said transmission rate;

interpolation means responsive to said stored signal sequence and to first and second control signals for interpolating said stored signal sequence with reference to said first and second control signals in order to produce first and second partial interpolated signals and responsive thereto said interpolated signal sequence; and said processing means comprising:

detection means responsive to said interpolated signal sequence for detecting phases of said first partial interpolated signals in relation to said sampling rate to produce a sequence of phase signals which are representative of said phases;

calculating means responsive to said phase signals for calculating first and second internal control signals related to said first and second partial interpolated signals, respectively; and reference timing signal generating means operatively coupled to said detection means for generating a sequence of reference timing signals with reference to the phases of said first partial interpolated signals; and delivery means coupled to said calculating means and said interpolation means for delivering said first and second internal control signals to said interpolation means as said first and second control signals, respectively.

2. A synchronization circuit responsive to an input signal carrying a transmission data signal and being received at a transmission rate for producing an output signal which is representative of reproductions of said transmission data signal, said circuit comprising:

sampling means responsive to said input signal for sampling it at a predetermined sample rate to produce a sequence of sampled signals at said predetermined sample rate, each of said sampled signals having a level represented by zero through (M−1) bits;

interpolating means coupled to said sampling means for interpolating said sampled signal sequence to produce an interpolated signal sequence; and precessing means coupled to said interpolating means for processing said interpolated signal sequence to produce said output signal at said transmission rate;

said interpolating means comprising:

separating means responsive to said sampled signal sequence for separating each of said sampled signals into said zero through (M−1) bits, in parallel;

zero through (M−1) elementary interpolation filters, there being M number filters for individually and successively interpolating said zero through (M−1) bits into zero through (M−1) fragmentary interpolated signals, respectively; and combining means coupled to elementary interpolation filters for combining said zero through (M−1) fragmentary interpolated signals into said interpolated signals.

3. A synchronization circuit responsive to an input signal carrying a transmission data signal and being sent at a transmission rate for producing an output signal which is representative of reproductions of said transmission data signal, said circuit comprising:

sampling means responsive to said input signal for sampling it at a predetermined sample rate to produce a sequence of sampled signals at said predetermined sample rate, each of said sampled signals having a level represented by zero through (M−1) bits;

interpolating means coupled to said sampling means for interpolating said sampled signal sequence to produce an interpolated signal sequence; and processing means coupled to said interpolating means for processing said interpolated signal sequence to produce said output signal at said transmission rate;

said interpolating means comprising:

separating means responsive to said sampled signal sequence for separating each of said sampled signals into said zero through (M−1) bits, in parallel;

zero through (M−1) elementary interpolator filters, there being M number, each of said filters being controllable by a sequence of timing control signals, said elementary interpolator filters individually and successively interpolating said zero through (M−1) bits into zero through (M−1) fragmentary interpolated signals in response to said timing signal, respectively; and combining means coupled to said elementary interpolation filters for combining said zero through (M−1) fragmentary interpolated signals into said interpolated signals;

said processing means comprising:

signal producing means coupled to said combining means for producing internal control signals from said interpolated signals; and timing control means responsive to said internal control signals for producing said timing control signals.

4. A synchronization circuit as claimed in anyone of the claims 1, 2, 3 wherein said predetermined sample rate is different from said transmission rate.

5. A synchronization circuit as claimed in anyone of the claims 1, 2, 3, said transmission data signal being produced at a transmission period determined by said transmission rate, wherein said interpolated signal sequence is divisible into first partial interpolated signals produced at said transmission rate and second partial interpolated signals which are produced at said transmission rate and delayed relative to said first partial interpolated signals by a common duration which is equal to a half of said transmission period;

said processing means comprising:

timing signal producing means controllable by a local input signal for producing first and second timing signals for said first and second partial interpolated signals, respectively;

subsampling means coupled to said timing signal producing means and responsive to said interpolated signal sequence for subsampling said interpolated signal sequence by said first and second timing signals to produce said first and second partial interpolated signals, respectively;

local processing means coupled to said subsampling means for processing said first and second partial interpolated signals to produce said output signal and an internal control signal which is dependent on said output signal and said second partial interpolated signals; and means for delivering said internal control signal to said timing signal producing means as said local input signal.

* * * * *